2 Sheets—Sheet 1.

A. DRAKE.

Corn-Planter.

No. 634. Reissued Dec. 14, 1858.

N. PETERS, PHOTO-LITHOGRAPHER, WASHINGTON, D. C.

2 Sheets—Sheet 2.

A. DRAKE.

Corn-Planter.

No. 634 Reissued Dec. 14, 1858.

N. PETERS, PHOTO-LITHOGRAPHER, WASHINGTON, D. C.

UNITED STATES PATENT OFFICE.

NATHANIEL DRAKE, OF NEWTON, NEW JERSEY.

IMPROVEMENT IN CORN-PLANTERS.

Specification forming part of Letters Patent No. 19,242, dated February 2, 1858; Additional Improvement dated September 28, 1858; Reissue No. 631, dated December 14, 1858.

*To all whom it may concern:*

Be it known that I, NATHANIEL DRAKE, of Newton, in the county of Sussex and State of New Jersey, have invented certain new and useful Improvements in Corn-Planters; and I do hereby declare that the following is a full, clear, and exact description of the same, reference being had to the annexed drawings, making a part of this specification, in which—

Figure 1:
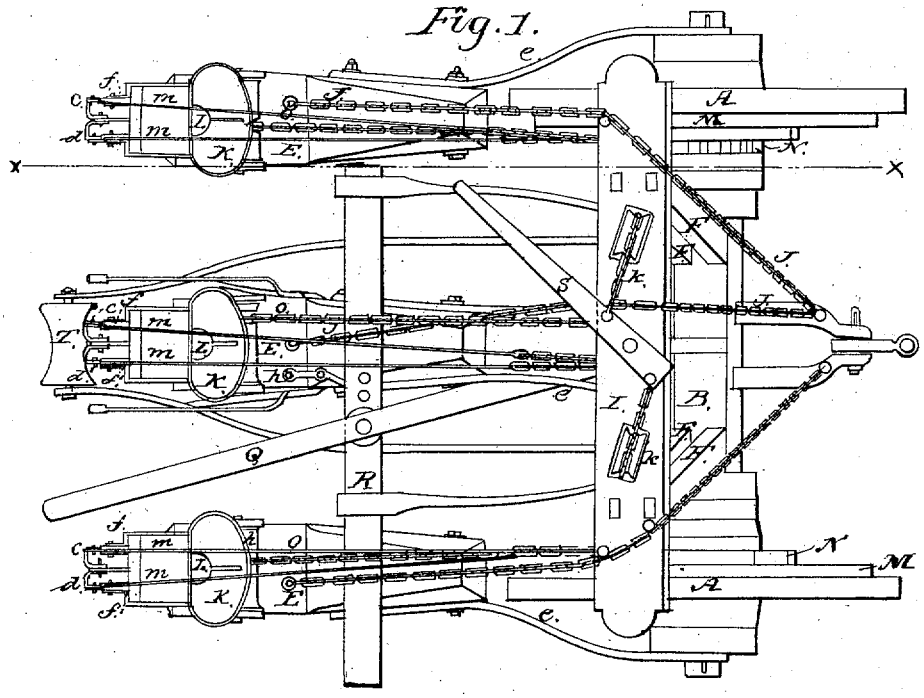
Figure 2:
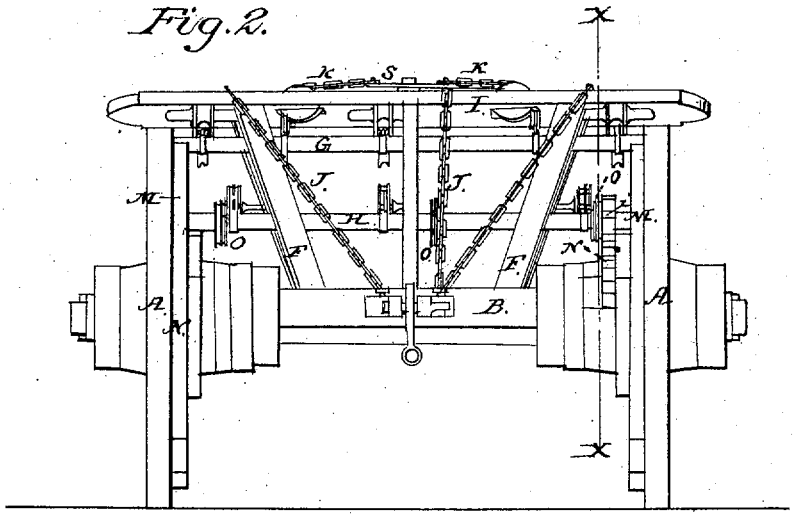
Figure 3:
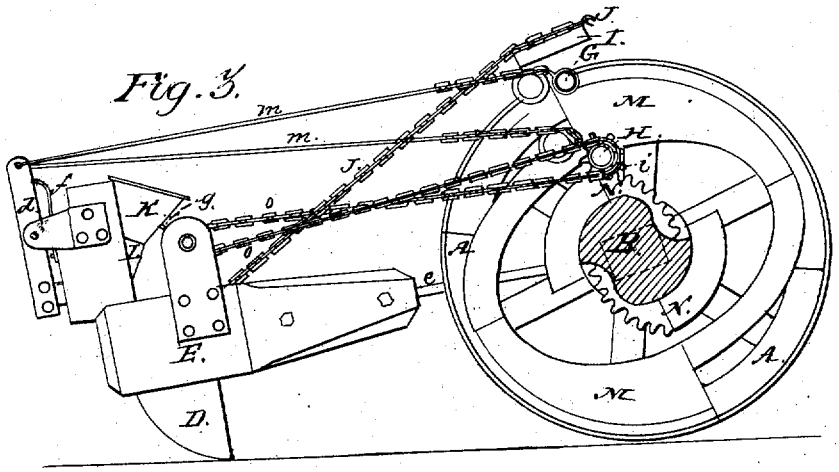
Figure 5:
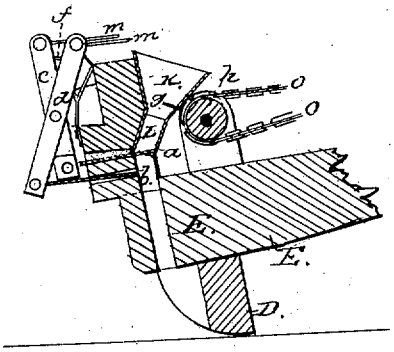
Figure 4:
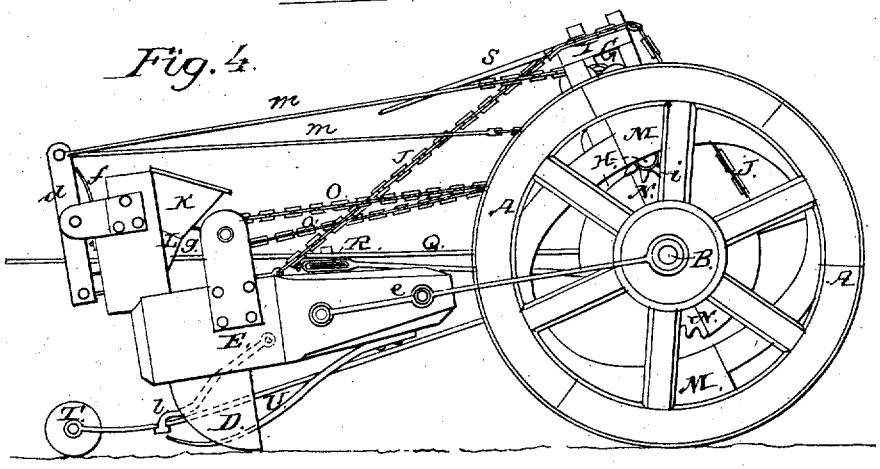

Figure 1, Sheet No. 1, is a plan or top view of my improved machine; Fig. 2 on said sheet, a front elevation with some of the rear parts omitted; Fig. 3, Sheet No. 2, a vertical longitudinal section, showing the parts at the left-hand side of the line X X, drawn across Figs. 1 and 2. Fig. 4, on the same sheet, is a side elevation; and Fig. 5, also on the same sheet, is a sectional elevation of some of the parts, and shows the construction and operation of the clearing apparatus for keeping the valves from clogging, and also the construction and arrangement of the valves. Fig. 1, Sheet No. 3, is a sectional elevation of my improvement, showing the plow or leveling attachment. Fig. 2, on the same sheet, is a plan of a portion of same. Fig. 3, also on the same sheet, is a rear elevation of the same; and Fig. 4 is a sectional elevation of one of the seed-boxes and its valves, so far as the same and similar parts exist in the machine hereinafter described.

Similar letters of reference indicate corresponding parts in the several figures.

This invention consists, first, in a peculiar means employed for operating the seed-distributing device, as hereinafter fully shown and described; second, in the employment or use of a seed-agitating device.

The object of the invention is to obtain a machine that will plant two or more rows simultaneously, and at the same time the seed-distributing device of each hopper allowed to be under the complete control of the operator, so that either or both may be so actuated as to insure the accurate planting of the seed in check-rows, and also to prevent the possibility of the clogging or choking of the seed-distributing device.

To enable those skilled in the art to fully understand and construct my invention, I will proceed to describe it.

A A are the traction-wheels. B is the axle; D, the plows, which are here represented as being three in number, and are so connected to the axle that they may rise and fall independently of each other and of the position of the wheels to accommodate themselves to the unevenness of the ground over which they pass. The plows are hung to the beams E *e* E *e* E *e*, which are jointed to the axle B for the purpose of allowing this vertical motion to the plows, as above stated. There are stanchions or posts F framed into the axle B to support the rollers or weights G H, which operate the valves and keep them in position. These stanchions or posts are secured at the top by the cap I. The weight of the tongue and whiffletrees upon the hounds would naturally throw the stanchions forward out of their proper place; but this effect is prevented by the check-chains J, which are attached to the hounds, and, passing over the cap I, connect at the other end to the beams E, and thus by the weight of that one of three beams which happens to be in the lowest position keeps the stanchions in the proper position.

K K K are the hoppers in which the seed is placed, constructed and arranged as shown in the drawings. They terminate at the bottom in tubes L, which conduct the seed to the ground, and serve as valve-boxes in which the seed is measured by the valves *a b*, which open alternately for that purpose. These valves *a b* are attached to levers *c d*, and are opened by the weight of the rollers G H, which are connected to these levers *c d* by the connecting rods and chains *m*. The rollers G H are raised by the cams M N, which are attached to the traction-wheels for that purpose to allow the valves to be closed by the spring *f*. An inspection of the form of the cams as represented in the drawings will make their relative motions quite clear.

To prevent the seed from becoming choked in upon the upper valve the arm *g*, attached to the shaft *h*, is made to work upward through the narrow slit in the tubes L in such a manner as to agitate the seed and insure the filling of the valves. The shaft *h* has an intermittent motion for that purpose, communicated to it by the chain O, from the roller or weight H, to which this intermittent motion is given by the cam-wheel N, working into the pinion *i* on the roller H. The amount of seed delivered at each dropping is measured by the cavity between the valves *a* and *b*. In order to insure greater certainty in the filling of the seed-measuring cavity, I have formed the cam M with an additional depression at *a'*, (see Fig. 1, Sheet No. 3,) by which the upper valve is returned and again withdrawn, thus giving it two outward and returned motions as often as the lower valve is once opened and closed. To further agitate the seed and secure still greater certainty in filling the seed-measuring cavity, I attach a rib, *b'*, to the upper valve, *a*, which rib insures a perfect agitation of the seed in the hopper. The form and construction of this rib are fully shown in Figs. 2 and 4, Sheet No. 3.

I would remark that in order to prevent any derangement of the valves, which might occur in consequence of a considerable elevation or depression of one of the plows D, the chains which operate the valves may be attached to levers B' and extended under pulleys *d'*, and thence back to the valve-levers, by which arrangement the effect of the vibration of the plows in taking up or slackening the chains which work the valves is mostly neutralized. The levers B' are bent to extend under the rollers or weights G H, as shown in Fig. 1, Sheet No. 3.

It is considered an object with farmers to plant in what is termed "check-rows," or, in other words, in rows both ways; but this has been found very difficult, (even where the best machines for that purpose have been used,) on account of the difference caused in the rotation of the traction-wheels by the unevenness of the ground. To obviate this difficulty in a measure a plow, W, (see Figs. 1 and 2, Sheet No. 3,) may be attached forward of each of the traction-wheels to level the ground and cause said wheels to measure the distance across the field with greater uniformity than they otherwise would; still, even by the use of the plows W, a perfect uniformity of rotation of the traction-wheels cannot be obtained, and the seed by these alone could not be accurately planted in check-rows. The desired object, however, is fully attained by the weights or rods G H and the cams M N, arranged as described for operating the valves *a b*.

It will clearly be seen from the description already given that if the machine be drawn along in a right line on even or level ground both traction-wheels will be rotated with equal speed, and that both ends of each weight or rod G H will drop off the prominent portions of their respective cams simultaneously. In this case, therefore, the seed will of course be accurately planted in check-rows, for the valves of each hopper will be actuated simultaneously; but if the machine be drawn over uneven ground one side (the one most elevated) will move in advance of the other and "cant" the machine out of line with the direct line of draft. This movement of the machine of course deranges the accurate dropping of the seed. The same effect also would be obtained by the canting or turning of the machine by the team, for rods or weights at one end will drop before the they will at the other—viz., the ends which are actuated by the cams that are attached to the wheel at the elevated side of the machine, or the wheel that describes the arc. This, however, is readily remedied by giving the machine a precisely reverse movement, so that the opposite ends of the rods will be brought around in line and the rods placed in a position at right angles with the line of draft. By this means the seed at one side of the machine will be dropped in line with that at the other side, for as the dropping of the seed at one side of the machine in advance of the other is due to the canting or turning of the machine, it follows, as a matter of course, that a reverse movement will produce a reverse effect. Thus it will be seen that by the means employed for actuating the seed-distributing device the machine may be so operated as to insure the perfect or accurate dropping or planting of the seed in check-rows.

I do not claim the leveling-plows W, for they have been previously used; but,

Having thus described my invention, what I claim as new, and desire to secure by Letters Patent, is—

1. Operating the seed-valves *a b* from the traction-wheels A A by means of the rods or weights G H and cams M N, arranged substantially as and for the purpose set forth.

2. The agitator *g*, arranged with relation to the seed boxes and valves, substantially as set forth.

3. The rib *b*, attached to the upper valve, constructed and operating as shown and described, for the purpose stated.

4. Combining with one of the weights which operate the valves, or its equivalent, a cam-shaped gear-wheel corresponding in form with the cams which operate said weights, substantially as and for the purpose set forth.

5. Extending the chains which operate the valves down under the pulleys *d'*, back of the axle, so as to obviate the slackening and taking up of the chains by the vibrations of the plows D and their attachments, as set forth.

NATHANIEL DRAKE.

Witnesses:

ALFRED H. FITCH,
JOHN C. SHINER.